United States Patent Office 3,215,744
Patented Nov. 2, 1965

3,215,744
CYCLOALKENYL ADDUCTS OF UNSATURATED
SULFONES
John P. Luvisi, Park Ridge, Ill., assignor to Universal Oil
Products Company, Des Plaines, Ill., a corporation of
Delaware
No Drawing. Filed Dec. 11, 1962, Ser. No. 243,727
9 Claims. (Cl. 260—607)

This invention relates to new compositions of matter which are prepared by condensing unsaturated compounds with unsaturated sulfones. More particularly the invention is concerned with new compositions of matter which are prepared by condensing a conjugated diolefinic compound with an olefinic sulfone.

It has now been discovered that new compositions of matter comprising cycloalkenyl adducts of unsaturated sulfones may be prepared by condensing at least one molecular proportion of said conjugated diolefinic compound with an unsaturated sulfone in the presence of an inert solvent. These new compositions of matter, particularly those which comprise the condensation product of polychloro conjugated diolefins, with the unsaturated sulfone are useful as insecticides and in addition, may also be utilized as intermediates in the preparation of other organic compounds such as resins, pharmaceuticals, plasticizers, etc. For example, the condensation product which results when one molecular proportion of hexachlorocyclopentadiene is condensed with one molecular proportion of divinyl sulfone, namely, 5-(1,2,3,4,7,7-hexachloro-2-norbornenyl) vinyl sulfone or the condensation product which results when two molecular proportions of hexachlorocyclopentadiene is condensed with one molecular proportion of divinyl sulfone, namely, bis[5-(1,2,3,4,7,7-hexachloro-2-norbornenyl)]sulfone are useful as insecticides particularly against houseflies.

It is therefore an object of this invention to prepare new compositions of matter which are useful in the chemical field.

A further object of this invention is to prepare new compositions of matter, some of which may be useful as insecticides, by condensing a conjugated diolefinic compound with an unsaturated sulfone.

Taken in its broadest aspect one embodiment of this invention resides in a process which comprises condensing an olefinic sulfone with a conjugated diolefinic compound selected from the group consisting of alkadienes, cycloalkadienes, haloalkadienes and halocycloalkadienes at condensation conditions, and recovering the resultant product.

A further embodiment of this invention is found in a process which comprises condensing a divinyl sulfone with a conjugated diolefinic compound selected from the group consisting of alkadienes, cycloalkadienes, haloalkadienes and halocycloalkadienes at a temperature in the range of from about 50° to about 250° C. and at a pressure within the range of from about atmospheric to about 100 atmospheres, and recovering the resultant product.

Yet another embodiment of this invention is found in a cycloalkenyl adduct of an olefinic sulfone.

A specific embodiment of this invention resides in a process which comprises condensing a molar equivalent of divinyl sulfone with a molar equivalent of hexachlorocyclopentadiene at a temperature in the range of from about 50° to about 250° C. and at a pressure within the range of from about atmospheric to about 100 atmospheres, and recovering the resultant 5-(1,2,3,4,7,7-hexachloro-2-norbornenyl) vinyl sulfone.

Another specific embodiment of this invention is found in 5-(1,2,3,4,7,7-hexachloro-2-norbornenyl)methyl allyl sulfone.

Other objects and embodiments will be found in the following further detailed description of this invention.

As hereinbefore set forth it has now been discovered that new compositions of matter may be prepared by condensing a conjugated diolefinic compound selected from the group consisting of alkadienes, cycloalkadienes, haloalkadienes and halocycloalkadienes with an olefinic sulfone to prepare compounds which are designated as cycloalkenyl adducts of unsaturated sulfones. For purposes of this invention, the term "cycloalkenyl" will include cycloalkenyl, bicycloalkenyl, halocycloalkenyl, polyhalocycloalkenyl, halobicycloalkenyl and polyhalobicycloalkenyl compounds. In addition, the term "halosubstituted" as used hereinafter in the specification and appended claims will refer to both mono- and polyhalosubstituted compounds.

Examples of conjugated diolefinic compounds selected from the group consisting of alkadienes, cycloalkadienes, haloalkadienes and halocycloalkadienes, which are utilized as starting materials in the process of this invention include (1) straight chain conjugated diolefins having the general formula:

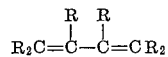

in which the R's are independently selected from the group consisting of alkyl or hydrogen radicals, at least one R of each of the double bonded carbon atoms being hydrogen; or (2) conjugated cycloalkadienes having the general formula:

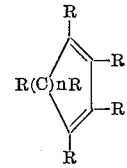

in which the R's are independently selected from the group consisting of hydrogen or alkyl radicals and $n$ is one or two. Examples of these compounds include conjugated alkadienes such as 1,3-butadiene,
2-methyl-1,3-butadiene (isoprene),
2,3-dimethyl-1,3-butadiene,
1,3-pentadiene,
2-methyl-1,3-pentadiene,
3-methyl-1,3-pentadiene,
2,3-dimethyl-1,3-pentadiene,
2-ethyl-1,3-pentadiene,
3-ethyl-1,3-pentadiene,
2,4-hexadiene,
3-methyl-2,4-hexadiene,
3,4-dimethyl-2,4-hexadiene,
3-ethyl-2,4-hexadiene,
3,4-diethyl-2,4-hexadiene,
1,3-hexadiene,
2-methyl-1,3-hexadiene,
3-methyl-1,3-hexadiene,
2-ethyl-1,3-hexadiene,
3-ethyl-1,3-hexadiene,
2,3-diethyl-1,3-hexadiene,
2,4-heptadiene,
3-methyl-2,4-heptadiene,
4-methyl-2,4-heptadiene,
3,4-dimethyl-2,4-heptadiene,
3-ethyl-2,4-heptadiene,
4-ethyl-2,4-heptadiene,
3,4-diethyl-2,4-heptadiene, 1,3-heptadiene,
2-methyl-1,3-heptadiene,
3-methyl-1,3-heptadiene,
2,3-dimethyl-1,3-heptadiene,
2-ethyl-1,3-heptadiene,
3-ethyl-1,3-heptadiene,
2,3-diethyl-1,3-heptadiene, etc.;
cycloalkadienes and alkyl substituted cycloalkadienes such as 1,3-cyclopentadienes which for purposes of this invention will be designated as cyclopentadienes and include cyclopentadiene,
1-methylcyclopentadiene,
2-methylcyclopentadiene,
5-methylcyclopentadiene,
1,2-dimethylcyclopentadiene,
1,3-dimethylcyclopentadiene,
5,5-dimethylcyclopentadiene,
1,2,3-trimethylcyclopentadiene,
1,2,3,4-tetramethylcyclopentadiene,
hexamethylcyclopentadiene,
1-ethylcyclopentadiene,
2-ethylcyclopentadiene,
5-ethylcyclopentadiene,
1,2-diethylcyclopentadiene,
1,3-diethylcyclopentadiene,
5,5-diethylcyclopentadiene,
1,2,3-triethylcyclopentadiene,
1,2,3,4-tetraethylcyclopentadiene,
hexaethylcyclopentadiene, etc.
It is also contemplated within the scope of this invention that conjugated cycloalkadienes such as
1,3-cyclohexadiene,
1-methyl-1,3-cyclohexadiene,
2-methyl-1,3-cyclohexadiene,
5-methyl-1,3-cyclohexadiene,
1,2-dimethyl-1,3-cyclohexadiene,
1,3-dimethyl-1,3-cyclohexadiene,
1,4-dimethyl-1,3-cyclohexadiene,
5,6-dimethyl-1,3-cyclohexadiene,
1,2,3-trimethyl-1,3-cyclohexadiene,
1,2,4-trimethyl-1,3-cyclohexadiene,
1,4,5-trimethyl-1,3-cyclohexadiene,
1,5,6-trimethyl-1,3-cyclohexadiene, etc.,
may also be used although not necessarily with equivalent results; (3) halogenated conjugated straight-chain diolefins containing only carbon, hydrogen and halogen atoms having the general formula:

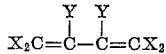

in which the X's are independently selected from the group consisting of hydrogen or halogen radicals having an atomic weight of from 35 to 127 (i.e., chlorine, bromine, iodine), at least one of the X's being halogen and Y is independently selected from the group consisting of alkyl, haloalkyl, halogen and hydrogen radicals, or (4) halogenated conjugated cycloalkadienes containing only carbon, hydrogen and halogen atoms and having the general formula:

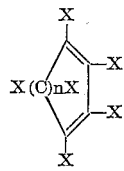

in which the X's have the same meaning as above and $n$ is 1 or 2. Examples of these compounds include haloalkadienes such as 1-chloro-1,3-butadiene, 1,3-dichloro-1,3-butadiene, 1-bromo-1,3-butadiene, 1,3-dibromo-1,3-butadiene, 1,3-diiodo-1,3-butadiene, 1,1,3-trichloro 1,3-butadiene, 1,1,3-tribromo1,-3-butadiene, 1-iodo-1,3-butadiene, 1,2-diiodo-1,3-butadiene, 1,1,3-triiodo-1,3- butadiene, 1,1,2-trichloro-1,3-butadiene, 1,1,2-tribromo-1,3-butadiene, 1,1,2-triiodo-1,3-butadiene, 1,1,4-trichloro-1,3-butadiene, 1,1,4-tribromo-1,3-butadiene, 1,1,4-triiodo-1,3-butadiene, 1,1,4,4 - tetrachloro - 1,3 - butadiene, 1,1,4,4 - tetrabromo-1,3-butadiene, 1,1,4,4-tetraiodo-1,3-butadiene, 1,1,2,3-tetrachloro-1,3-butadiene, 1,1,2,3-tetrabromo-1,3-butadiene, 1,1,2,3 - tetraiodo - 1,3 - butadiene, 1,1,2,3,4-pentachloro-1,3-butadiene, 1,1,2,3,4-pentabromo-1,3-butadiene, 1,1,2,3,4-pentaiodo-1,3-butadiene, 1,3-dichloro-2-methyl-1,3-butadiene, 1,4-dichloro-2-methyl-1,3-butadiene, 1,1,4,4-tetrachloro-2-methyl-1,3-butadiene, 1,4-dichloro-2-chloromethyl-1,3-butadiene, 1,4-dichloro-2-dichloro-methyl-1,3-butadiene 1,1,4-trichloro-2-methyl-1,3-butadiene, 1,1,4,4-tetrachloro-2-methyl-1,3-butadiene, 1,1,4,4-tetrachloro-2-chloromethyl-1,3-butadiene, 1,3-dibromo-2-methyl-1,3-butadiene, 1,4 - dibromo-2-methyl-1,3-butadiene, 1,1,4,4-tetrabromo-2-methyl-1,3-butadiene, 1,4-dibromo-2-bromomethyl-1,3-butadiene, 1,4-dibromo-2-dibromomethyl-1,3-butadiene, 1,1,4-tribromo-2-methyl-1,3-butadiene, 1,1,4,4-tetrabromo-2-methyl-1,3-butadiene, 1,1,4,4-tetrabromo-2-bromomethyl 1,3-butadiene, 1,3-diiodo-2-methyl-1,3-butadiene, 1,4-diiodo-2-methyl-1,3 - butadiene, 1,1,4,4 - tetraiodo-2-methyl-1,3-butadiene, 1,4 - diiodo-2-iodomethyl-1,3-butadiene, 1,4-diiodo-2-diiodomethyl-1,3-butadiene, 1,1,4 - triiodo - 2 - methyl - 1,3-butadiene, 1,1,4,4-tetraiodo-2-methyl-1,3-butadiene, 1,1,4,4-tetraiodo-2-iodomethyl-1,3-butadiene, etc.; halocycloalkadienes such as halogenated 1,3-cyclopentadienes which for purposes of this invention will be designated as halogenated cyclopentadienes including 1-chlorocyclopentadiene, 1,2-dichlorocyclopentadiene, 1,2,3-trichlorocyclopentadiene, 1,2,3,4-tetrachlorocyclopentadiene, 1,2,3,4,5 - pentachlorocyclopentadiene, hexachlorocyclopentadiene, 1-bromocyclopentadiene, 1,2-dibromocyclopentadiene, 1,2,3 - tribromocyclopentadiene, 1,2,3,4-tetrabromocyclopentadiene, 1,2,3,4,5-pentabromocyclopentadiene, hexabromocyclopentadiene, 1-iodocyclopentadiene, 1,2-diiodocyclopentadiene, 1,2,3-triiodocyclopentadiene, 1,2,3,4 - tetraiodocyclopentadiene, 1,2,3,4,5-pentaiodocyclopentadiene, hexaiodocyclopentadiene, etc. It is also contemplated within the scope of this invention that polyhalo-substituted conjugated cyclohexadienes such as 1,2-dichloro-1,3-cyclohexadiene, 1,2,3-trichloro-1,3-cyclohexadiene, octachloro-1,3-cyclohexadiene, etc. 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. In addition it is also contemplated that polyhaloalkadienes and polyhalocycloalkadienes which are used in this process may contain more than one species of halo substituents, such as, for example, 1,1-dichloro-3-bromo-1,3-butadiene, 1-chloro-3-bromo-1,3-butadiene, 1-iodo-3-chloro-1,3-butadiene, 2 - bromo - 3 - chloro-1,3-butadiene, 1,4-dichloro-2-bromomethyl-1,3-butadiene, 1,4-dichloro-2-iodomethyl-1, 3 - butadiene, 1 - chloro-2-bromocyclopentadiene, 1,2 - dichloro-5,5-dibromocyclopentadiene, etc., may be used although not necessarily with equivalent results.

The aforementioned conjugated unsaturated compounds are condensed with an olefinic sulfone which has the generic formula:

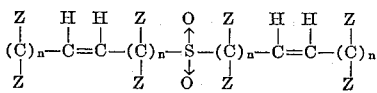

in which Z may be selected from the group consisting of hydrogen, alkoxy, alkyl, halo and haloalkyl radicals, and $n$ is an integer of from 0 to about 3. Examples of compounds which fall within the above formula include divinyl sulfone, diallyl sulfone, dimethallyl sulfone, dicrotenyl sulfone, the isomeric dipentenyl sulfones, dihexenyl sulfones, diheptenyl sulfones, etc.; di(1-chloroallyl) sulfone, di(1-bromoallyl) sulfone, di(1-iodoallyl) sulfone, di(1-chloromethallyl) sulfone, di(1-bromomethallyl) sulfone, di(1-iodomethallyl) sulfone, di(1-methyl-3-pentenyl) sulfone, di(1,1-dimethyl-3-pentenyl) sulfone, di(1,4-dimethyl-3-pentenyl) sulfone, etc. It is to be understood that the aforementioned unsaturated sulfones are only representatives of the class of compounds which may be used and that the present invention is not necessarily limited thereto.

It is also contemplated within the scope of this invention that the process may be further extended by condensing the adducts formed by the condensation of a conjugated alkadiene or cycloalkadiene which does not contain any other atoms besides carbon and hydrogen atoms with other conjugated dienes. For example, the mono- or diadduct which is formed by the condensation between divinyl sulfone and cyclopentadiene, namely, 5-(2-norbornenyl)vinyl sulfone and bis[5-(2-norbornenyl)] sulfone may be further condensed with hexachlorocyclopentadiene to form 5,6,7,8,9,9-hexachloro-1,2,3,4,4a,5,8,8a-octahydro-1,4,5,8-dimethano-2-naphthyl vinyl sulfone and bis (5,6,7,8,9,9-hexacholoro-1,2,3,4,4a,5,8,8a-octahydro-1,4,5, 8-dimethano-2-naphthyl) sulfone, respectively.

As hereinbefore set forth the product which is obtained according to the process of this invention may comprise either the mono- or diadduct of the olefinic sulfone, the particular product formed being independent upon the mole ratio of conjugated diolefinic compound to the unsaturated sulfone. For example, when a monoadduct is desired, one molar equivalent of the conjugated diolefinic compound is condensed with one molar equivalent of the unsaturated sulfone while if the diadduct is desired, two molar equivalents of the conjugated diolefinic compound is condensed with one molar equivalent of the unsaturated sulfone.

The condensation process of the present invention is effected at temperatures within the range of from about 50° to about 250° C. and at pressures ranging from atmospheric to about 100 atmospheres or more. Generally speaking, the amount of pressure which is utilized during the condensation between the aforementioned starting materials is dependent upon the types of reactants used and the temperature at which the condensation is effected, the amount of pressure usually being that which is sufficient to maintain a major portion of the reactants in the liquid phase. In addition, the reaction is usually effected in the presence of an inert organic solvent, such solvents including aromatic hydrocarbons such as benzene, toluene, o-xylene, m-xylene, p-xylene, ethylbenzene, etc.; paraffinic hydrocarbons such as n-pentane, n-hexane, n-heptane, etc.; cyclic paraffins such as cyclopentane, methylcyclopentane, cyclohexane, cycloheptane, etc.

The process of this invention may be effected in any suitable manner and may comprise either a batch or continuous type operation. For example, when a batch type operation is used, a quantity of the starting materials comprising the unsaturated sulfone and, if so desired, an inorganic solvent of the type hereinbefore set forth, is placed in a condensation apparatus provided with heating and mixing means. A particularly effective type of apparatus which may be used comprises a rotating autoclave wherein the desired reactants may be sealed and pressure applied to maintain said reactants in the liquid phase. The condensation apparatus has added thereto the conjugated alkadiene, cycloalkadiene, haloalkadiene or halocyclo alkadiene at a predetermined rate, the temperature and pressure of the apparatus are then brought to the desired or predetermined level and maintained thereat until the residence time for the reaction is completed. If superatmospheric pressures are required, the pressure may be obtained by pressing in an inert gas such as nitrogen until the predetermined pressure level has been reached. At the end of the residence time the apparatus and contents thereof are allowed to cool to room temperature, the excess pressure, if any, is vented and the desired reaction product is separated from unreacted starting materials and solvent by conventional means, such as, fractional distillation, crystallization, etc. Alternatively, the reactants and solvent, if any, may be first admixed prior to entry into the reaction vessel and then heated to the desired reaction temperature.

Another method of effecting the condensation reaction of the present invention is by continuous type operation. In this type of operation the starting materials comprising the unsaturated sulfone and the conjugated diolefinic compound are continuously charged to a reactor which is maintained at the proper operating conditions of temperature and pressure. If so desired, inert organic solvents of the type hereinbefore set forth, may be added through a separate line or may be admixed with one or the other of the starting materials prior to entry into said reaction and charged thereto in a single stream. Following the completion of the residence time, the reaction product is continuously withdrawn from the reactor, separated from the reactor effluent and purified by conventional means hereinbefore set forth, while the unreacted starting materials are separated and recharged to the reactor as a portion of the feed stock.

Examples of compounds which may be prepared according to the process of this invention and which may be characterized as mono- and diadducts of unsaturated sulfones have the generic formulae:

(1) 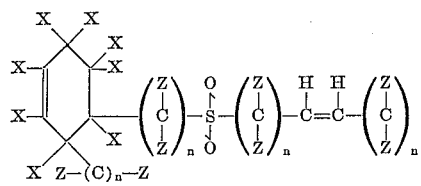

(2) 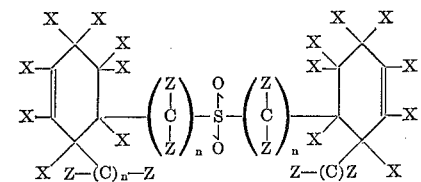

(3) 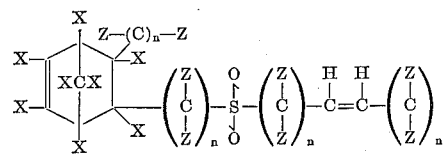

(4) 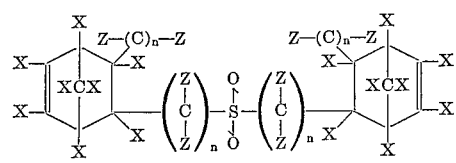

in which the Z and X radicals have the same meaning as in the hereinbefore set forth generic formulae pertaining to the starting materials. Representative compounds which fall within these generic formulae includes 3-cyclohexenyl vinyl sulfone, 4-methyl-3-cyclohexenyl vinyl sulfone, 2,4-dichloro-3-cyclohexenyl vinyl sulfone, 2,4-dibromo-3-cyclohexenyl vinyl sulfone, 2,4-diiodo-3-cyclohexenyl vinyl sulfone, 2,3,4-trichloro-3-cyclohexenyl vinyl sulfone, 2,3,4-tribromo-3-cyclohexenyl vinyl sulfone, 2,3,4-triiodo-3-cyclohexenyl vinyl sulfone, 2,3,4,5,6-pentachloro-3-cyclohexenyl vinyl sulfone, 2,3,4,5,6-pentabromo-3-cyclohexenyl vinyl sulfone, 2,3,4,5,6-pentaiodo-3-cyclohexenyl vinyl sulfone, 5-(2-norbornenyl) vinyl sulfone, 5-(1,2,3,4,7,7-hexachloro-2-norbornenyl) vinyl sulfone, 3-cyclohexenylmethyl allyl sulfone, 3-cyclohexenylethyl butenyl sulfone, 3-cyclohexenylpropyl pentenyl sulfone, 3-cyclohexenylbutyl hexenyl sulfone, 4-methyl-3-cyclohexenylmethyl allyl sulfone, 4-methyl-3-cyclohexenylethyl butenyl sulfone, 4-methyl-3-cyclohexenylpropyl pentenyl sulfone, 4-methyl-3-cyclohexenylbutyl hexenyl sulfone, 2,5-dichloro-3-cyclohexenylmethyl allyl sulfone, 2,5-dichoro-3-cyclohexenylethyl butenyl sulfone, 2,5-dichloro-3-cyclohexenylpropyl pentenyl sulfone, 2,5-dichloro-3-cyclohexenylbutyl hexenyl sulfone, 2,5-dibromo-3-cyclohexenylmethyl allyl sulfone, 2,5-dibromo-3-cyclohexenylethyl butenyl sulfone, 2,5-dibromo-3-cyclohexenylpropyl pentenyl sulfone, 2,5-dibromo-3-cyclohexenylbutyl hexenyl sulfone, 2,5-diiodo-3-cyclohexenylmethyl allyl sulfone, 2,5-diiodo-3-cyclohexenylethyl butenyl sulfone, 2,5-diiodo-3-cyclohexenylpropyl pentenyl sulfone, 2,5-diiodo-3-cyclohexenylbutyl hexenyl sulfone, 5-(2-norbornenyl)methyl allyl sulfone, 5-(2-norbornenyl)ethyl butenyl sulfone, 5-(2-norbornenyl)propyl pentenyl sulfone, 5-(2-norbornenyl)butyl hexenyl sulfone, bis(3-cyclohexenyl) sulfone, bis(3-cyclohexenylmethyl) sulfone, bis(3-cyclohexenylethyl) sulfone, bis(3-cyclohexenylpropyl) sulfone, bis (3-cyclohexenylbutyl) sulfone, bis (4-methyl-3-cyclohexenyl) sulfone, bis[5 - (1,2,3,4,7,7 - hexachloro-2-norbornenyl)] sulfone, etc. It is to be understood that the aforementioned compounds are only representatives of the types of compounds which may be prepared and that the present process is not necessarily limited thereto.

The physical properties of the halo-substituted adducts of unsaturated sulfones, both mono- and diadducts, and the effects they have on entomological forms of life make them particularly desirable as insecticides and insect repellents, the compounds having many of the features desired of materials of this purpose. They are, for example, toxic to insects which are destructive to plant life and material normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents or dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired as in the treatment of fibrous material, such as wood, for extinction of a particular infestation, for example, wood termites. For other purposes, the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The following examples are given to illustrate the process of the present invention which, however, are not intended to limit the generally broad scope of the present invention in strict accordance therewith.

EXAMPLE I

One hundred and eighteen grams (1.0 mole) of divinyl sulfone dissolved in 100 cc. of toluene is charged to a rotating autoclave of 850 cc. capacity. The autoclave is sealed and 54 grams (0.1 mole) of 1,3-butadiene is pressured in. The autoclave is then heated to 130° C. and maintained between 130°–180° C. for a period of 4 hours. The autoclave is cooled to room temperature and the excess pressure vented. The desired product comprising 3-cyclohexenyl vinyl sulfone is obtained by subjecting the reaction contents to fractional distillation under reduced pressure, separating and recovering the desired fraction.

EXAMPLE II

In a manner similar to Example I, 146 grams (1.0 mole) of diallyl sulfone in 100 cc. of benzene is reacted with 54 grams (1.0 mole) of 1,3-butadiene for a period of 4 to 20 hours. At the end of this time the autoclave contents is subjected to fractional distillation under reduced pressure and the cut comprising 3-cyclohexenylmethyl allyl sulfone is separated and recovered.

EXAMPLE III

In this example a solution of 118 grams (1.0 mole) of divinyl sulfone and 66 grams (1.0 mole) of cyclopentadiene in 100 cc. of xylene is refluxed for a period of about 20 hours. Following the completion of the desired residence time the xylene is removed by vacuum and the reaction product remaining is subjected to fractional distillation under reduced pressure. The cut comprising 5-(2-norbornenyl) vinyl sulfone is separated and recovered.

EXAMPLE IV

A solution of 118 grams (1.0 mole) of divinyl sulfone and 276 grams (1.0 mole) of hexachlorocyclopentadiene and 100 cc. of toluene is treated in a manner similar to that set forth in the above examples. Fractional distillation under reduced pressure of the resulting reaction mixture after removal of the solvent will permit recovery of a cut comprising 5-(1,2,3,4,7,7-hexachloro-2-norbornenyl) vinyl sulfone.

EXAMPLE V

A solution of 146 grams (1.0 mole) of diallyl sulfone and 276 grams (1.0 mole) of hexachlorocyclopentadiene in 100 cc. of toluene is refluxed for a period of about 20 hours. The desired reaction product comprising 5-(1,2,3,4,7,7-hexachloro-2-norbornenyl)methyl allyl sulfone is recovered in a manner similar to that set forth in the above examples.

EXAMPLE VI

In this example a solution of 146 grams (1.0 mole) of diallyl sulfone and 552 grams (2.0 mole) of hexachlorocyclopentadiene in 250 cc. of toluene is refluxed for a period of about 20 hours. Following the completion of the desired residence time, the toluene is removed by vacuum and the reaction product remaining is then subjected to fractional distillation under reduced pressure. The cut comprising bis[5-(1,2,3,4,7,7-hexachloro-2-norbornenyl)methyl] sulfone is separated and recovered.

EXAMPLE VII

An insecticidal composition is prepared by taking 1 gram of 5-(1,2,3,4,7,7-hexachloro-2-norbornenyl) vinyl sulfone and dissolving the compound in 2 cc. of benzene. The resulting solution is added to 100 cc. of water with Triton X–100 as an emulsifying agent. The solution is sprayed into a cage containing houseflies and will cause a 100% knockdown. Similar insecticidal tests using halogenated cycloalkenyl adducts of unsaturated sulfones will show similar results.

I claim as my invention:

1. A cycloalkenyl adduct of an olefinic sulfone and a diolefinic compound selected from the group consisting of conjugated halobutadienes, halocyclopentadienes, and halocyclohexadienes, wherein said halo is selected from the group consisting of chlorine, bromine and iodine.

2. A cycloalkenyl adduct of an olefinic sulfone and a conjugated halocyclopentadiene in which the halogen is selected from the group consisting of chlorine, bromine and iodine.

3. A cycloalkenyl adduct of an olefinic sulfone and hexachlorocyclopentadiene.

4. 3-cyclohexenylmethyl vinyl sulfone.

5. 3-cyclohexenylmethyl allyl sulfone.

6. 5-(2-norbornenyl) vinyl sulfone.

7. Bis[5 - (1,2,3,4,7,7 - hexachloro - 2 - norbornenyl)- methyl] sulfone.

8. 5-(1,2,3,4,7,7-hexachloro-2-norbornenyl)methyl allyl sulfone.

9. 5-(1,2,3,4,7,7-hexachloro-2-norbornenyl) vinyl sulfone.

References Cited by the Examiner

UNITED STATES PATENTS

| 2,427,925 | 9/47 | Sameniago et al. | 260—607 |
| 2,493,364 | 1/50 | Schoene | 260—607 |

OTHER REFERENCES

Adler et al.: Ber. Deut. Chem. 71, 2451–2461 (1938), cited in Chem. Abs. 33, 1299' (1939).

CHARLES B. PARKER, *Primary Examiner.*

DANIEL D. HORWITZ, *Examiner.*